United States Patent
Adami et al.

(10) Patent No.: US 10,324,711 B2
(45) Date of Patent: Jun. 18, 2019

(54) SYSTEM AND METHOD FOR THE DATA MANAGEMENT IN THE INTERACTION BETWEEN MACHINES

(71) Applicant: EUROTECH SPA, Amaro (IT)

(72) Inventors: Stefano Adami, Volano (IT); Paolo Azzoni, Pergine Valsugana (IT)

(73) Assignee: EUROTECH SPA, Amaro (IT)

( * ) Notice: Subject to any disclaimer, the term of this patent is extended or adjusted under 35 U.S.C. 154(b) by 0 days.

(21) Appl. No.: 15/549,704

(22) PCT Filed: Feb. 9, 2016

(86) PCT No.: PCT/EP2016/052748
§ 371 (c)(1),
(2) Date: Aug. 9, 2017

(87) PCT Pub. No.: WO2016/128415
PCT Pub. Date: Aug. 18, 2016

(65) Prior Publication Data
US 2018/0032327 A1 Feb. 1, 2018

Related U.S. Application Data

(60) Provisional application No. 62/113,814, filed on Feb. 9, 2015.

(30) Foreign Application Priority Data

Feb. 9, 2015 (IT) .............................. UD2015A0014

(51) Int. Cl.
*G06F 8/71* (2018.01)
*H04W 4/70* (2018.01)
(Continued)

(52) U.S. Cl.
CPC ............ *G06F 8/71* (2013.01); *G06F 16/2455* (2019.01); *G06F 16/24575* (2019.01);
(Continued)

(58) Field of Classification Search
CPC ................. G06F 17/30477; G06F 8/71; G06F 17/30528; G06F 17/3053; G06F 17/30734; H04W 4/70; H04W 4/50; H04W 4/60
(Continued)

(56) References Cited

U.S. PATENT DOCUMENTS 8,200,700 B2 * 6/2012 Moore .................... G06F 16/27
707/791
8,347,088 B2 * 1/2013 Moore .................. G06Q 50/00
713/166
(Continued)

FOREIGN PATENT DOCUMENTS

| GB | 2513976 A | 11/2014 |
|---|---|---|
| WO | 2004021184 A2 | 3/2004 |
| WO | 2013013386 A1 | 1/2013 |

OTHER PUBLICATIONS

International Search Report and Written Opinion from PCT/EP2016/052748 dated Apr. 20, 2016.

*Primary Examiner* — Marina Lee
(74) *Attorney, Agent, or Firm* — Calfee Halter & Griswold LLP

(57) ABSTRACT

A method and a system for data management in the interaction between machines in a deployed system in which a plurality of devices are made to use a Dataset Semantic Broker (DBS) platform that stores ontologies, wherein the ontologies comprise semantic representation of datasets, the method providing automatic linking of datasets and devices.

10 Claims, 8 Drawing Sheets

(51) Int. Cl.
  *H04W 4/60*     (2018.01)
  *H04W 4/50*     (2018.01)
  *G06F 16/36*    (2019.01)
  *G06F 16/2455*  (2019.01)
  *G06F 16/2457*  (2019.01)

(52) U.S. Cl.
  CPC ...... *G06F 16/24578* (2019.01); *G06F 16/367* (2019.01); *H04W 4/50* (2018.02); *H04W 4/70* (2018.02); *H04W 4/60* (2018.02)

(58) Field of Classification Search
  USPC .......................................... 717/122, 168–178
  See application file for complete search history.

(56) References Cited

U.S. PATENT DOCUMENTS

| | | | |
|---|---|---|---|
| 8,839,246 B2* | 9/2014 | Fitzgerald | G06F 9/455 717/173 |
| 2002/0165847 A1 | 11/2002 | McCartney et al. | |
| 2004/0068724 A1* | 4/2004 | Gardner, III | G06F 8/65 717/173 |
| 2007/0061266 A1* | 3/2007 | Moore | G06Q 50/00 705/51 |
| 2007/0061487 A1* | 3/2007 | Moore | G06F 16/27 709/246 |
| 2010/0312779 A1* | 12/2010 | Lim | G06F 17/3064 707/759 |
| 2013/0104251 A1* | 4/2013 | Moore | G06F 21/602 726/30 |
| 2013/0138659 A1* | 5/2013 | Fang | G06F 17/3089 707/741 |
| 2013/0203394 A1 | 8/2013 | Dong et al. | |
| 2013/0262576 A1* | 10/2013 | Foti | H04W 4/005 709/204 |
| 2014/0330929 A1* | 11/2014 | Dong | A61B 5/0022 709/217 |
| 2015/0012551 A1* | 1/2015 | Dong | G06F 16/245 707/755 |
| 2015/0026183 A1 | 1/2015 | Tonkin | |
| 2016/0019294 A1* | 1/2016 | Dong | H04W 4/70 707/794 |
| 2018/0032327 A1* | 2/2018 | Adami | H04W 4/70 |

* cited by examiner

SYSTEM AND METHOD FOR THE DATA MANAGEMENT IN THE INTERACTION BETWEEN MACHINES

CROSS-REFERENCE TO RELATED APPLICATIONS

This application is the U.S. national stage entry of International Application No. PCT/EP2016/052748, filed Feb. 9, 2016, which claims priority to and the benefit of U.S. Application No. 62/113,814, filed on Feb. 9, 2015, and Italian Application No. UD2015A000014, filed on Feb. 9, 2015, the entire contents of which are incorporated herein by reference.

TECHNICAL FIELD

The present invention refers to a system and method for the management of data targeted to the interaction between machines and based on the description of data meaning and/or concepts.

STATE OF THE ART

As the Internet evolves and as users come to demand and expect better Internet services, it may be important to shift away from the current focus of the Internet on data collection and towards more evolved techniques to improve user experience. Further, emerging technologies such as sensors, radio frequency identification (RFID) and near-field communications (NFC) make it possible to connect all physical things or objects together in an Internet. It is, therefore, desirable to have smart and reliable Internet services. It is also desirable for Machine-to-Machine (M2M) or Internet of Things (IoT) architectures to be content-centric, context-aware, cloud-based, collaborative and cognitive, so that smart and reliable services may be provided.

Machine to Machine (M2M) is the group of technologies and applications used in telemetry and telematics that adopt wireless networks, wired networks, or combination thereof, to connect devices, objects and things. The most important feature of these technologies is the interoperability, which is the ability of a system or informatic products to cooperate and exchange information with other systems or products without misunderstandings, with reliability and with an optimization of the information sources.

Multiple devices operating in an environment to share data and information are very well known to an ordinary skilled in the field of machine-to-machine. The various devices involved in a M2M system can be represented, only as an example, by sensors, actuators, relays, home appliances, vehicles, mobile phones, computers, controllers or other similar devices known to those of ordinary skill in the art.

The data consumed and produced by these devices during the operation are stored in a dataset, commonly defined as a set of raw and/or elaborated data. In conventional M2M systems of the prior art, the datasets are stored in the databases without any semantic representation of the meaning of the data contained in the datasets themselves. Consequently, the logic of existing applications is typically bound to specific information and doesn't exploit dynamically the meaning of the information; without their meaning it is hard to understand the content of data.

Further, the prior-art M2M systems are not satisfactory because they are static and not re-usable, which means that the new datasets cannot be produced on the fly in the conventional M2M system.

Major challenges for the emerging field of M2M systems and communication include creation of a significantly effective system for reliable and effective datasets and database management; evolving method for effective real time processing of huge web based data; creating system and method for modulation of web based data including data virtualization and its effective communication to remote devices, preferably in real time.

It is known that semantics and ontologies have been used to improve standard database queries, resulting in tables of raw data. For example, in the patent application US2010/0312779, a SQL query is enriched with synonyms of a word that are identified analyzing a previously defined ontology of synonyms, resulting in a table of raw data that includes also rows containing the selected synonyms. With the teaching of this document, however, it is not possible to provide a full response to a query in which the parameter of the query is an entire generic ontology and the result of the query is an entire generic ontology.

It is a main object of the present invention to propose a system and method for the management of data targeted to the interaction between machines and based on the description of data meaning and/or concepts.

Another object of the present invention is to propose a system for the management of datasets targeted to the interaction between remote machines, the system involving a novel software based management method to improve the interoperability between devices, particularly adopting a novel approach for providing the automatic dataset association, a dataset virtualization and a virtual dataset.

Another object is to propose a system and a method that allow the automatic creation of the association between the devices and the datasets.

It is still another object of the present invention to provide a system and a method for automatic application upgrade that allow machine oriented automatic upgrade and adaptation of application.

A further object is to propose a system and a method that are focused on dataset virtualization to increase the number of available datasets and to create new datasets immediately on demand.

Yet another object is to propose a system and a method that provide automatic data collection and usage to remote devices with the possibility to autonomously produce and consume data to/from datasets.

SUMMARY OF THE INVENTION

The present invention generally relates to a system and a method for the data management in the interaction between machines and based on the description of data meaning and/or concepts.

According to one aspect, the invention refers to a system and a method for data management in the interactions between machines in a deployed system, in which a plurality of devices are connected to a Dataset Semantic Broker (DSB) platform that stores ontologies, and wherein the ontologies include semantic representations of datasets, and the method provides automatic association between devices and datasets.

A Dataset Semantic Broker (DSB), as used in the present invention, is a software that supplies semantic information on concepts stored in a database. DSB is responsible for the management of the semantic representation of the datasets, the dataset access control and protection, the communication with remote devices, and the supplying of M2M services, such as dataset subscriptions and queries and information notifications.

In the preferred embodiment, the DSB is the enabling component of a data semantic marketplace platform targeting M2M applications, also called in the following "M2M Marketplace". The role of the M2M Marketplace is to manage the demand and supply of data in an M2M environment.

The method according to the invention includes at least a step of requesting a dataset, by at least one device of the plurality of devices, wherein the request is made to the DSB platform.

Here and in the following description and claims, if not otherwise specified, i.e. referring on a set of raw and/or elaborated data, the term dataset refers to a dataset ontology.

The method further includes at least a step of redirecting, by the DSB platform, the request to a Dataset Link Manager (DLM) and a step of identifying, by the DLM, a dataset matching the requested dataset.

The method also includes at least a step of notifying, by the DSB platform, the at least one device with the ontology of the matching dataset, wherein the ontology allows the device to access data of the matching dataset and using, by the at least one device, the matching dataset to perform an operation.

According to a further aspect, the invention is also referred to a method for automatically upgrading application program software running on at least one device including at least a step of determining, by the Dataset Semantic Broker (DSB) platform, at least one change in a semantic representation of a dataset to which the at least one device is associated.

The upgrading further includes at least a step of notifying, by the DSB platform, the at least one device and a developer of the application program software running on the at least one device about the at least one change in a semantic representation of a dataset and waiting, by the at least one device, for a new application program software version.

The upgrading also includes at least a step of updating, by the developer, the application program software to a new version and inserting, by the developer, a dataset ontology of the new version of the application program software, into the DSB platform. Moreover, the upgrading includes at least a step of notifying, by the DSB platform, the at least one device about the availability of the new version of the application program software and downloading, by the at least one device, the new version of the application program software.

According to another aspect, the invention is also referred to a method for dataset virtualization includes at least a step of initiating, by at least one device of a plurality of devices, a request for a dataset, wherein the request is made to the Dataset Semantic Broker (DSB) platform, and the DSB platform facilitates the association between datasets and the at least one device even if a dataset corresponding to the request is not available in the DSB platform.

The dataset virtualization further includes at least a step of analyzing, by a Dataset Virtualizer, existing dataset ontologies, wherein the existing dataset ontologies are stored on the DSB platform and creating, by the Dataset Virtualizer, a virtual dataset by using at least subsets of the existing dataset ontologies.

The method also includes at least a step of providing, by the DSB platform, the ontology of the virtual dataset to the at least one device.

The system proposed herein employs a reliable method of data management and exchanging information between connected devices in Machine to Machine deployments.

To deal with various limitations associated with interoperability of current systems, the proposed system herein introduces at least:
  an intrinsic support based on semantic representation of data;
  an automation that allows receiving notifications for upgrades on new datasets after client subscription.

These two aspects introduce dynamicity, improving flexibility in terms of development of the application logic and in business, and offering a possible automatic management of work life through a service.

Further features of the present system are:
  the ontology as a formal semantic representation of data;
  a shared vocabulary to describe concepts and/or object kinds that exist in a domain, and its proprieties and correlations.

Thus the system and the method for management of data herein propose:
  an ontology based on semantic description of data;
  a subscribe/notify architecture to automatically update data;
  the support for automatic reasoning on description of data.

According to the present invention, two different approaches can be used to interact with the Dataset Semantic Broker: Service Oriented Architecture (SOA) interface/protocol or a REST API.

The first one is based on a simple service oriented protocol that adopts the subscribe/notify model. A subscription to an ontology is generated when an application asks the DSB to be notified on any ontology change. When such ontology changes, using said interface, the DSB, knowing the list of applications subscribed to the ontology, executes the corresponding operations of notification.

The REST API is an Application Programming Interface responsible to check the presence of a change in the ontology using "get" function. An interpreter translates the "get" function in a standard internal query operation that is targeted to identify the change in the ontology to which the application is interested in; the query absolves the task of the subscriber and it follows the Rest-full standard.

In accordance with the present invention, the proposed system herein comprises:
a) An automatic dataset association that allows the automatic creation of the association between the device and the datasets it uses; the creation of the association comprises:
  The device requests the dataset;
  The dataset link manager (DLM) identifies the matching dataset; and
  The device is notified with the ontology of the requested dataset and starts working.
b) A dataset virtualization to increase the number of available datasets and to create new datasets on the fly.

In a possible embodiment, the dataset virtualization can comprise the following steps:
  A user application asks for a specific dataset that is not available in the M2M Marketplace;
  A dataset virtualizer analyses the ontology of the M2M Marketplace trying to understand if the requested dataset can be dynamically created from existent datasets;
  If it is possible, the virtualizer creates a virtual dataset and a new corresponding ontology using subsets of existing datasets.

c) An automatic application upgrade for the M2M applications running on the related devices.

d) An automatic data collection and usage to provide the machine with the possibility to autonomously produce and consume data to/from datasets.

BRIEF DESCRIPTION OF THE DRAWINGS

The characteristics, advantages and purposes of the invention above will be better understood with the description of the embodiments of the invention accompanying the attached drawings.

DETAILED DESCRIPTION OF THE INVENTION

Embodiments of the present invention are best understood by reference to the detailed figures and description set forth herein. These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Reference throughout this specification to "one embodiment", "another embodiment" or "an embodiment" means that a particular feature, structure, or characteristic described in connection with the embodiment is included in at least one embodiment of the present invention. Thus, the appearances of the phrases "in one embodiment", "in an embodiment" or "in another embodiment" in various places throughout this specification are not necessarily all referring to the same embodiment. Furthermore, the particular features, structures, or characteristics may be combined in any suitable manner in one or more embodiments.

The term non-relational database refers to a database that is not designed and structured using an ER (Entity Relationship) Model.

The non-relational database stores a set of raw data (or elaborated data) usually of huge dimensions.

The term semantics refers to the meaning of concepts and things represented by data in a dataset.

The term ontology refers to a mathematical model used to represent and use semantics.

The term dataset ontology refers to a semantic description of a dataset; instead of the ER model this approach provides the full meaning of the data contained in the dataset (not only entity and relations). The term link refers to a physical reference to the dataset (i.e. the IP address to the database server, the database name and the specific table).

The term dataset semantic broker (DSB) refers to a system that provides semantic information on the dataset stored in a database.

With the term device, in the whole following description, we will mean either the device itself or the application that runs on the specific device, depending on the circumstances. For example, with the term "device" it can be indicated a networking device on which runs an application that implements the SOP protocol or the REST API to connect to a DSB.

The present invention refers to a system and a method for managing the datasets in a so-called M2M Marketplace. The invention provides a Dataset Semantic Broker (DSB) to facilitate the operations of the M2M Marketplace.

Figure 1:
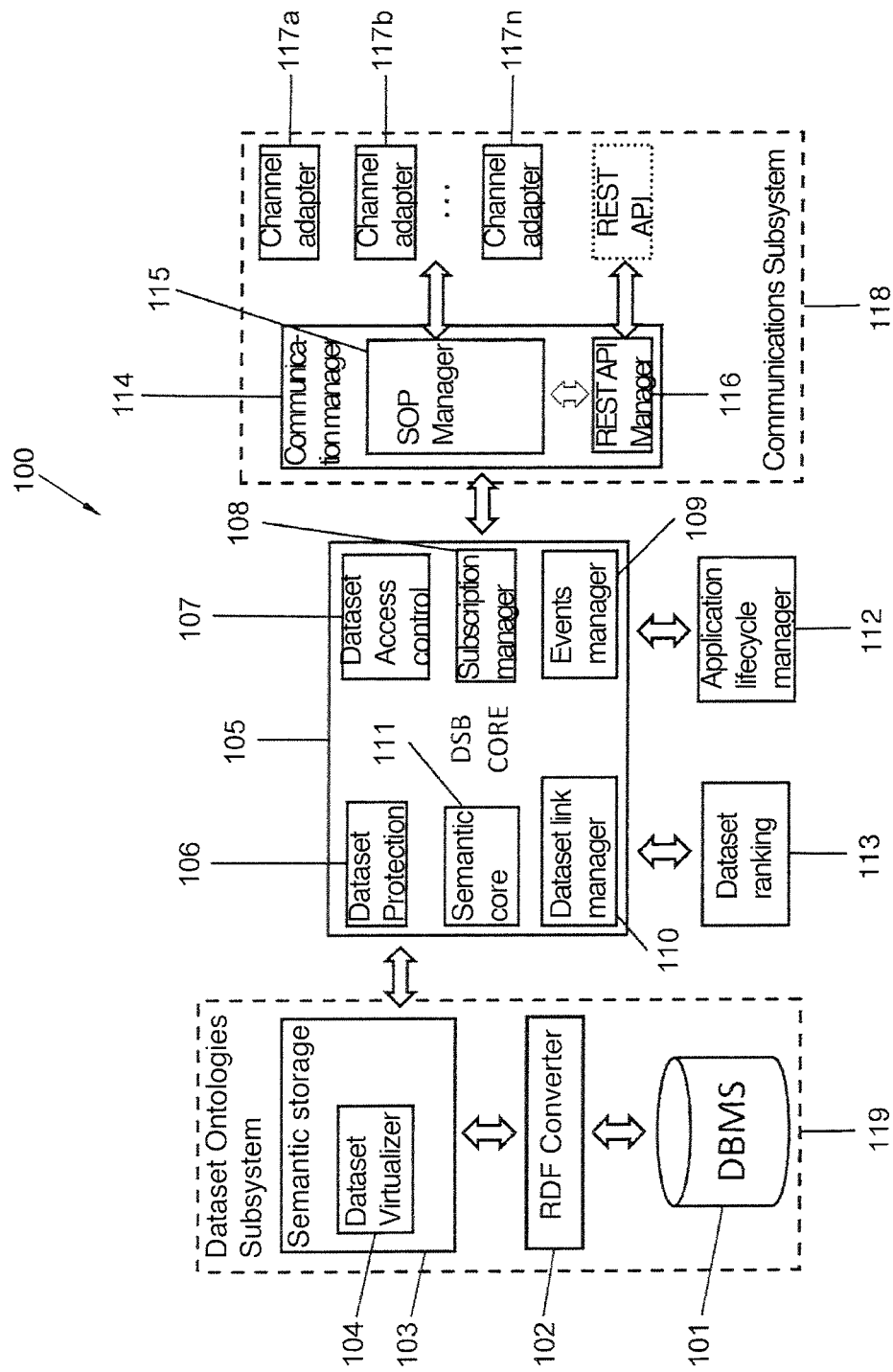
FIG. 1 is a block diagram to illustrate the architecture of Dataset Semantic Broker platform (DSB) according to an exemplary embodiment of the present invention.

FIG. 1 illustrates the architecture of a Dataset Semantic Broker platform (DSB) 100 according to an exemplary embodiment of the present invention.

The DSB facilitates association between datasets and the devices operating in the deployment environment and interacting with the M2M Marketplace. Unlike conventional methods of storing datasets, according to an aspect of the present invention, the datasets are stored in the form of ontologies along with semantic representation of the concepts and things (i.e. data) of the datasets. To be more precise, the DSB contains only the semantic description of the datasets (ontologies); in turn, the semantic description includes a link to the specific database in which the raw data are stored. In fact, the raw data are not contained in the DSB, but are located in a non relational database not being a part of the DSB.

The DSB is responsible for the management of the semantic representation of the dataset, the dataset access control and protection, the communication with remote devices, and the supplying of M2M services such as dataset subscriptions and information notifications. The DSB analyses the semantics of the datasets and provides the dataset required to at least one device. The DSB also facilitates the automatic upgrade of application running on the devices of the M2M system.

As shown in FIG. 1, the DSB 100 comprises a relational database DBMS 101 to store datasets semantic descriptions produced and used/consumed by the devices operating in the deployment environment and interacting with the M2M Marketplace. The Resource Description Framework (RDF) converter 102 describes the dataset ontology in a format that is compatible to be stored in the relational database DBMS 101. A semantic storage 103 manages the semantic representation of the data contained in the dataset (not only entity and relations). The semantics describe the full meanings of the concepts and features of the datasets. Semantics is a shared vocabulary to describe concepts and/or object types that exist in a domain, and its proprieties and correlations. The semantic storage 103 comprises a Dataset Virtualizer 104, which automatically and dynamically creates a virtual dataset when a dataset requested by a device is not available in the relational database DBMS 101. The Dataset Virtualizer 104 analyses the semantics of the existing datasets and determines whether a virtual dataset can be created using subsets of data from the existing datasets.

The Dataset Virtualizer 104 will be explained in greater detail later in this specification.

The DBMS 101, the RDF converter 102, the semantic storage 103 and the dataset virtualizer 104 together constitute the Dataset Ontologies Subsystem 119.

The system 100 also comprises a Dataset Semantic Broker (DSB) Core 105, which manages various operations of the M2M Marketplace according to an aspect of the present invention. In the embodiment here disclosed, the DSB core 105 comprises various modules like dataset protection module 106, dataset access control module 107, subscription manager module 108, events manager module 109, dataset link manager (DLM) module 110, and semantic core module 111.

The dataset protection module 106 and the dataset access control module 107 facilitate the protection from unauthorized access to the datasets stored in the relational database. The dataset access control module 107 allows or denies the access to the dataset to a specific user in accordance with the permission given to that user. If the allowance is given, the request is sent to the DLM module 110.

In an exemplary embodiment, the content stored on the DSB is restricted by an authentication and session management mechanism. A request for access to a specific dataset stored on the DSM platform is handled by the dataset protection module 106 and the dataset access control module 107.

More particularly, these modules protect the ontologies from two contemporary accesses in writing. When two users are allowed to write on the same ontology (same dataset), the module 107 gives access to the ontology to the first one that enters in it in writing. When the first user has finished, the access to the second user is given. This method allows to maintain the data coherence.

Further, these modules, for example, may authenticate the device by verifying the authentication information. The authentication information can be such as, but not limited to, the device ID, random number, IP address, MAC address, internet address, cookies, session ID or any other authentication information known to those of the ordinary skills in the art. If the device is not authenticated, said modules deny the access to the DSB server and may send a response to the device to indicate that authentication failed.

The authentication process may occur when the device first subscribes the system or alternatively the authentication process may occur every time a device submits a request.

The subscription manager module 108 facilitates the subscription of the devices to the dataset ontologies managed by the DSB. The subscription manager module 108 maintains a list of all the devices subscribed to the ontologies stored in the DSB and provides the notifications to the subscribed devices. When an event occurs that requires an action of a subscribed device, the subscription manager module 108 notifies the device.

The events manager module 109 manages the events occurring in the DSB. When an event occurs, the events manager module 109 triggers the subscription manager module 108, which notifies the subscribed devices about the respective event. The events manager module 109 interacts with an application lifecycle manager module 112, which facilitate the developer in the application upgrade process; this procedure is explained in greater detail later in this specification.

The dataset link manager (DLM) module 110, on receiving the request for a dataset, queries the dataset ontology stored on the relational database DBMS 101 for a matching dataset ontology. The DLM 110 identifies the matching dataset ontology and the DSB notifies the requesting device about the matching dataset ontology, receives the dataset ontology and the link contained in the ontology allows the device to access the dataset raw data.

The present invention proposes a solution in which the parameter of the query made to the DLM 110 is an entire generic ontology and the result of the query is an entire generic ontology. In other words, the present solution is related to a pattern matching considering the entire generic ontology, it does not concern any kind of queries improvement and it does not produce a table of raw data.

In another embodiment the DLM 110 adopts an integrated or external high level service module to improve or enhance the functionalities of DSB core. For example, an automatic machine dataset ranking module 113 can provide reliability and quality of information related to the datasets, which facilitates the DLM 110 to identify the best matching dataset related to the requesting device criteria.

The semantic core module 111 included in the dataset semantic broker core 105 cooperates with the semantic storage 103.

The DSB 100 also comprises a communication manager 114, which provides the interface between the DSB 100 and the plurality of devices operating in the deployment environment and interacting with the M2M Marketplace.

The communication manager 114 can utilize any of the two protocols, i.e. Service Oriented Protocol (SOP) or REST API, to facilitate the communications between the DSB 100 and the plurality of devices operating in the deployment environment and interacting with the M2M Marketplace. The communication manager 114 further comprises a SOP manager 115 for the Service Oriented Protocol (SOP) processing and a REST API manager 116 for processing the REST API protocol.

Service Oriented Protocol (SOP) is an application protocol that adopts a simple subscribe/notify model and specifies the interface between devices and the DSB system.

The SOP protocol is the standard interface for devices to access the DSB. Using the SOP interface 115 the subscriptions manager 108 reads the list of events and, knowing the list of applications subscribed to the ontologies, executes the corresponding operations of notification to the corresponding devices.

The REST API is based on a reverse approach where an application running on a device is responsible to check the presence of a change in the ontology using the "get" function. REST converter module 116 translates the "get" function in a standard internal query operation that is targeted to identify the change in the ontology to which the application is interested in. The REST API provides support for legacy systems that don't use natively the SOP protocol.

The communication manager 114 provides communication interfaces for devices interacting with the DSB 100 providing channel adapters 117a-117n for standard communication protocols such as wireless, wired or combination thereof.

The communication manager 114 may be configured to handle the interactions between the devices and the DSB system, through the SOP protocol. It handles requests, subscriptions and notifications for datasets received/sent from the devices through the channel adapters 117a-117n. The communication manager 114, the SOP manager 115, the REST API manager 116 and the channel adapters 117a-117n constitute the communications subsystem 118.

Figure 2:
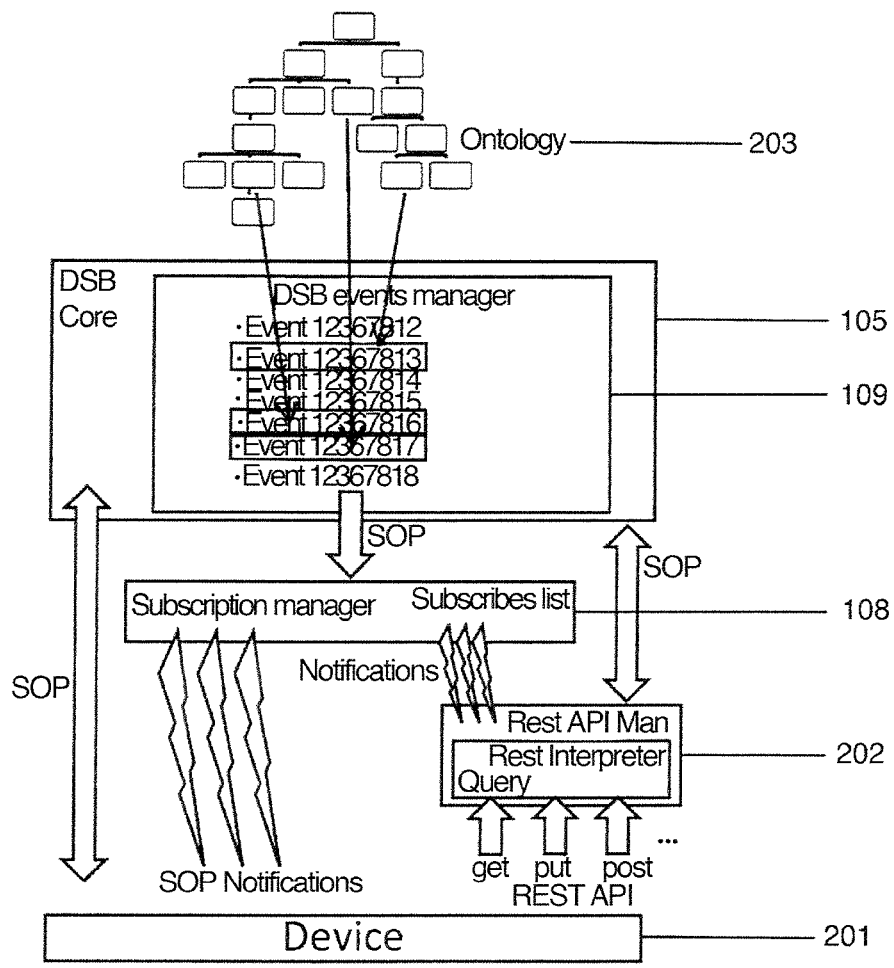
FIG. 2 illustrates a communication between a device operating in the deployment environment and interacting with a DSB according to an exemplary embodiment of the present invention.

FIG. 2 illustrates the communication between a device 201 and the DSB events manager 109 using SOP and REST API interfaces according to an exemplary embodiment of the present invention.

The device 201 is one of a plurality of devices operating in the deployment environment and interacting with the M2M Marketplace. The device 201 can interact with the DSB events manager 109 using either SOP protocol or REST API.

According to SOP protocol, when the DSB events manager 109 determines changes in an ontology 203 stored on the DSB 100, it generates the corresponding event and sends it to the event manager 109. The subscription manager 108 reads the list of events and the list of subscriptions, and notifies the device 201 about the event related to the ontology change, wherein the subscribers list is a list of applications, running on device 201, subscribed to the dataset 103 stored in the DSB 100.

Using the REST API approach, an application running on the device 201 uses the "get" function to determine a change in the ontology 203 stored on the DSB 100. A REST API manager 202 receives the query containing the "get" function from the device 201 and the Rest converter 116 converts the "get" function in a standard SOP query operation. The REST API manager 202 communicates with the DSB events manager 109 using the SOP protocol and gets the notifications about the changes in the ontology 203 by the subscription manager 108. In response to the "get" function received from the device 201, the REST API manager 202 sends to the device 201 the change in the ontology 203. The changes in the ontology 203 can be one or more events of deleting, updating, or inserting data in the ontology 203 as shown in FIG. 2. The other commands provided by the REST API (get, put, post, . . . ) are managed with the same procedure.

Figure 3:
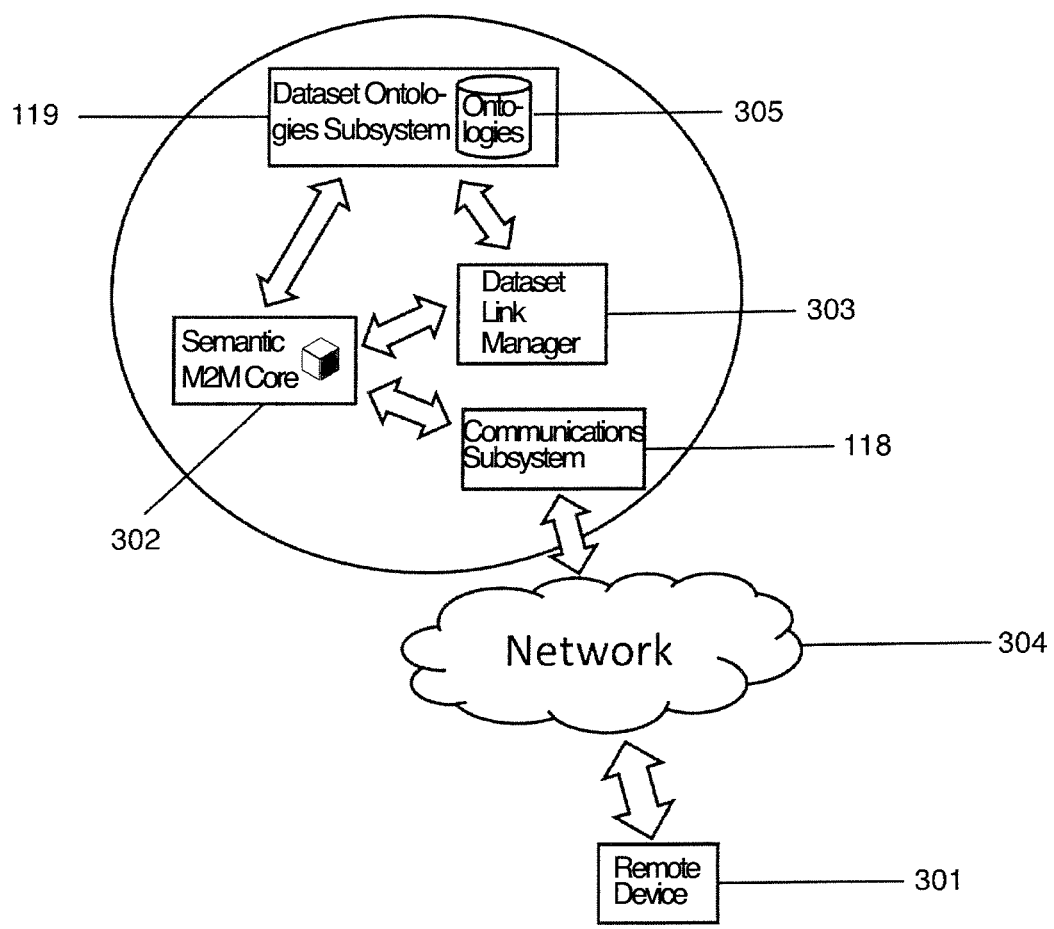
FIG. 3 illustrates automatic association between devices and datasets operating in an M2M Marketplace.

Automatic Dataset Association:

FIG. 3 functionally illustrates, by showing the interactions between the significant blocks, automatic association between devices and datasets operating in the deployment environment and interacting with an M2M Marketplace according to an aspect of the invention.

FIG. 3 shows a remote device 301 and the modules composing the DSB 100 as shown in FIG. 1: a semantic core 302, a dataset link manager 303, the communications subsystem 118 and the dataset ontologies subsystem 119.

The device communicates with the sematic core 302 through a network 304 and through the communications subsystem 118. The network 304 can be any wired or wireless network such as PSTN, telephonic lines, Bluetooth, wi-fi, wi-max, WLAN, or any other network known to an ordinary skilled in the art.

As shown in FIG. 3, the semantic core 302 stores the ontologies 305 in the dataset ontologies subsystem 119. The ontologies contain semantic data representation of the datasets. The device 301 transmits, via the network 304, a request for a dataset to the communications subsystem 118 and, from this, to the semantic core 302. The request for a dataset includes the ontology of the requested dataset (see also FIG. 4).

When a request for a dataset is received, the DSB analyses the semantics of the stored datasets and provides the requested dataset based on the analyses.

The sematic core 302 receives the request for a dataset from the remote device 301, through the communications subsystem 118, and redirects the request to the dataset link manager (DLM) 303.

The DLM 303 analyzes the semantic representations of the datasets stored in the dataset ontologies subsystem 120.

Based on the semantic representation of the datasets, the DLM 303 identifies a matching dataset corresponding to the dataset requested by the remote device 301. After identifying the dataset matching with the one requested by the remote device 301, the remote device 301 receives the matching dataset ontology, which contains the link to the requested raw data, and performs the operations which is intended to perform in the deployment environment.

Figure 4:
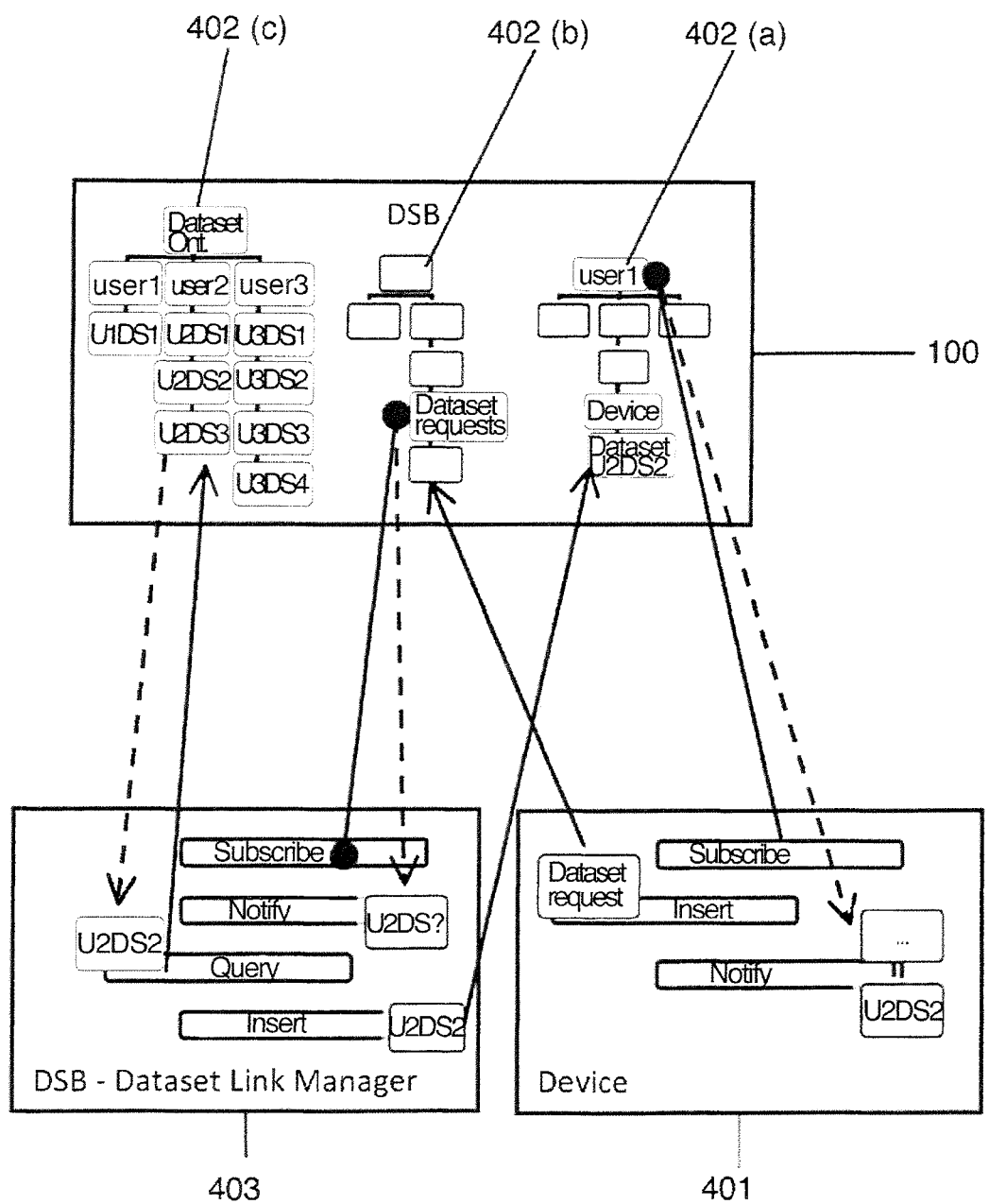
FIG. 4 illustrates automatic creation of an association between a device and its dataset operated by the DSB.

FIG. 4 depicts another exemplary embodiment of the present invention illustrating in details the automatic creation of an association between a device and a dataset.

FIG. 4 describes the association between a device and a dataset when the device requests a dataset. FIG. 4 shows a device 401, the DSB 100 shown in FIG. 1, ontologies 402(a)-402(c), and a dataset link manager 403. The dataset link manager 403 may form an integral part of the DSB 100 shown in FIG. 1.

The DSB 100 stores the ontologies of the dataset of the M2M Marketplace. The ontologies may be dataset ontologies and user ontologies. The user ontologies can be system ontologies, device ontologies and dataset ontologies related to the user application: system ontologies describe the M2M system deployment specific to the user while the device ontologies describe the different devices being part of the deployed system.

As shown in FIG. 4, a device 401 subscribes itself to the ontology of the system 402(a) defined by the user application. The DLM 403 is subscribed to the ontology of "dataset requests" 402(b) stored on the DSB 100.

The device 401 inserts the ontology of the requested dataset in the ontology 402(b) of dataset requests. The DLM 403 is notified about the new request. The DLM application 403 queries the dataset repository ontology 402(c) and identifies a matching dataset (For example U2DS2). The DLM 403 inserts the ontology of the identified dataset into the user ontology 402(a). Such insert operation creates a relation between the device ontology and the dataset ontology. This relation represents the association between the device and the dataset. The device 401 is notified with the ontology of the identified dataset and can start operating by producing and/or consuming data to/from the matching dataset.

Figure 5:
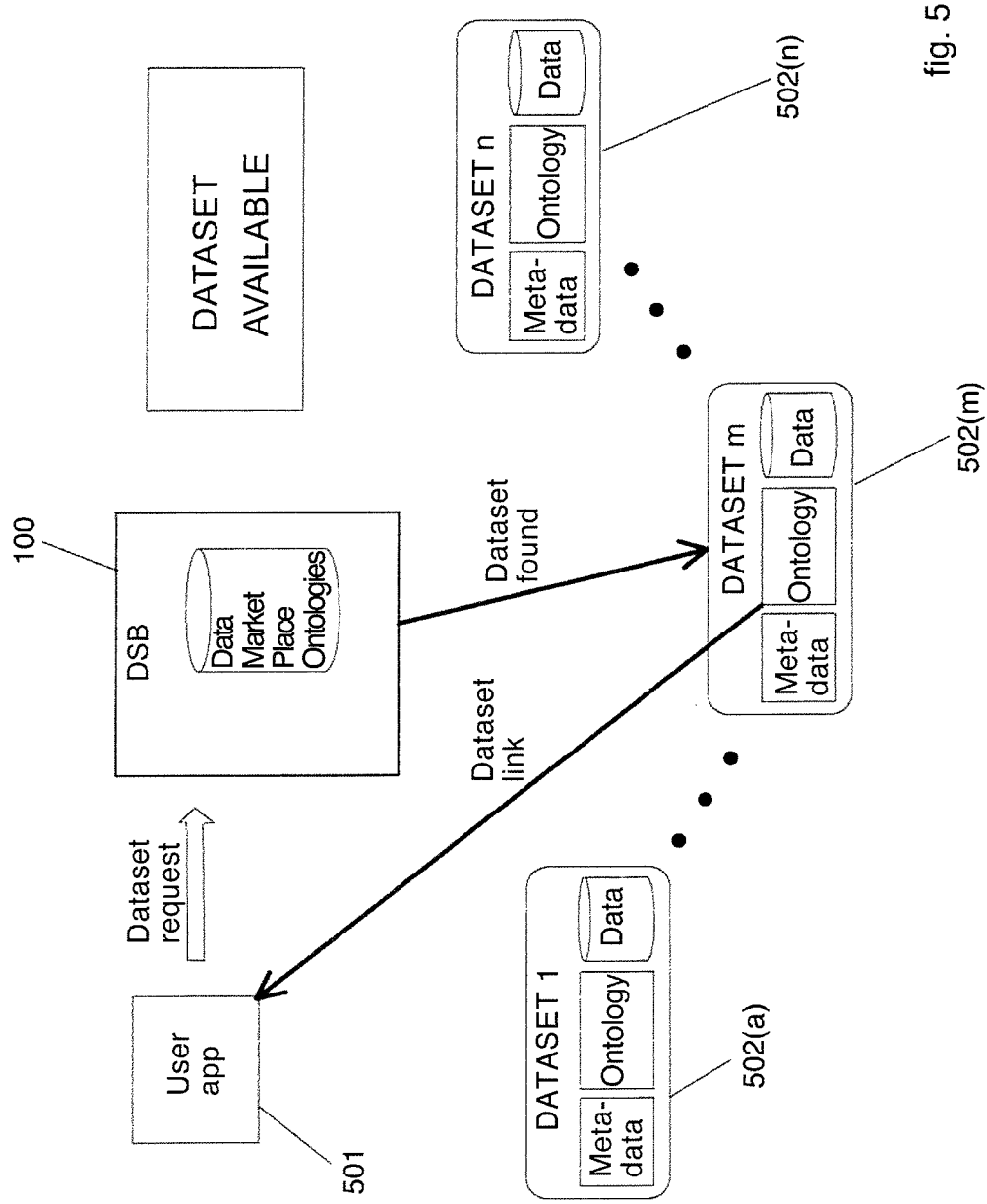
FIG. 5 illustrates an operation of the present invention when a dataset requested by a device is available in the M2M Marketplace.
Figure 6:
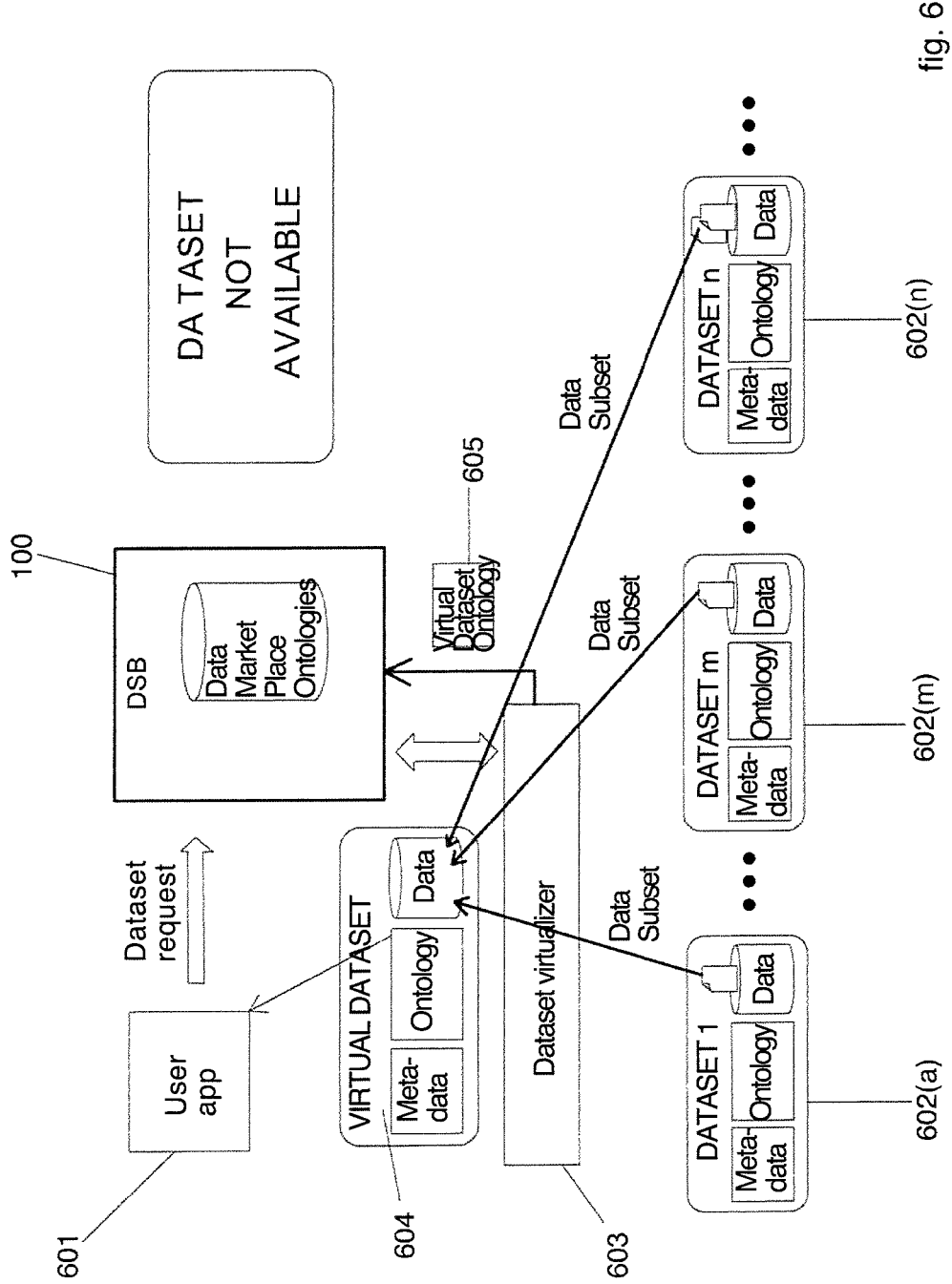
FIG. 6 illustrates an operation of a dataset virtualizer when a dataset requested by a device is not available in the M2M Marketplace.

Dataset Virtualization:

Dataset virtualization means dynamically creating a virtual dataset by using subsets of data from existing datasets when a specific dataset is not available in the M2M Marketplace. FIG. 5 and FIG. 6 explains the concept of dataset virtualization according to an aspect of the present invention. FIG. 5 illustrates an operation of the present invention when a dataset requested by a device is available in the M2M Marketplace.

As shown in FIG. 5, application 501 running on a device makes a request to the DSB 100. The DSB 100 searches for the requested dataset in the M2M Marketplace dataset ontologies. The DSB 100 identifies a matching dataset 502 (m) of a plurality of datasets 502 (a)-502 (n). The dataset 502 (m) is the dataset requested by the device application 501. The DSB 100 replies to the requesting device application 501 with the ontology of the requested dataset 502 (m).

FIG. 6 illustrates an operation of the present invention when a dataset requested by a device is not available in the DSB 100 of the M2M Marketplace and depicts the concept of dataset virtualization. As shown in FIG. 6, application 601 running on a device makes a request for a dataset to the DSB 100. The DSB 100 searches for the requested dataset and determines that the requested dataset is not available in the Marketplace. The DSB 100 redirects the request to a dataset virtualizer 603. The dataset virtualizer 603 analyses the ontologies of the Marketplace and determines whether the requested dataset can be dynamically created from the existent datasets or not. If it is possible to create a virtual dataset, the dataset virtualizer 603 analyses the semantic data representations of the existing datasets 602 (*a*)-602 (*n*) and creates a virtual dataset 604, wherein "VIRTUAL" is the metadata property of the new dataset, and a new corresponding ontology 605 using at least subsets of the existing datasets 602 (*a*)-602 (*n*) on the basis of their semantic data representations.

Using the semantics, the virtual dataset can be obtained by direct mapping on subsets of existing datasets or inferred with reasoning algorithms from subsets of existing datasets. The dataset virtualizer 603 inserts the virtual dataset ontology 605 into the M2M Marketplace ontologies 402 (*c*) and sends to the requesting device application 601 the created virtual dataset 604 ontology.

FIG. 6 further shows the subsets of data and of ontologies that are used from three datasets, but this is just an exemplary embodiment of the present invention, and any number of datasets and any number of subsets from each dataset may be used by the dataset virtualizer 603 to create the virtual dataset.

Figure 7:
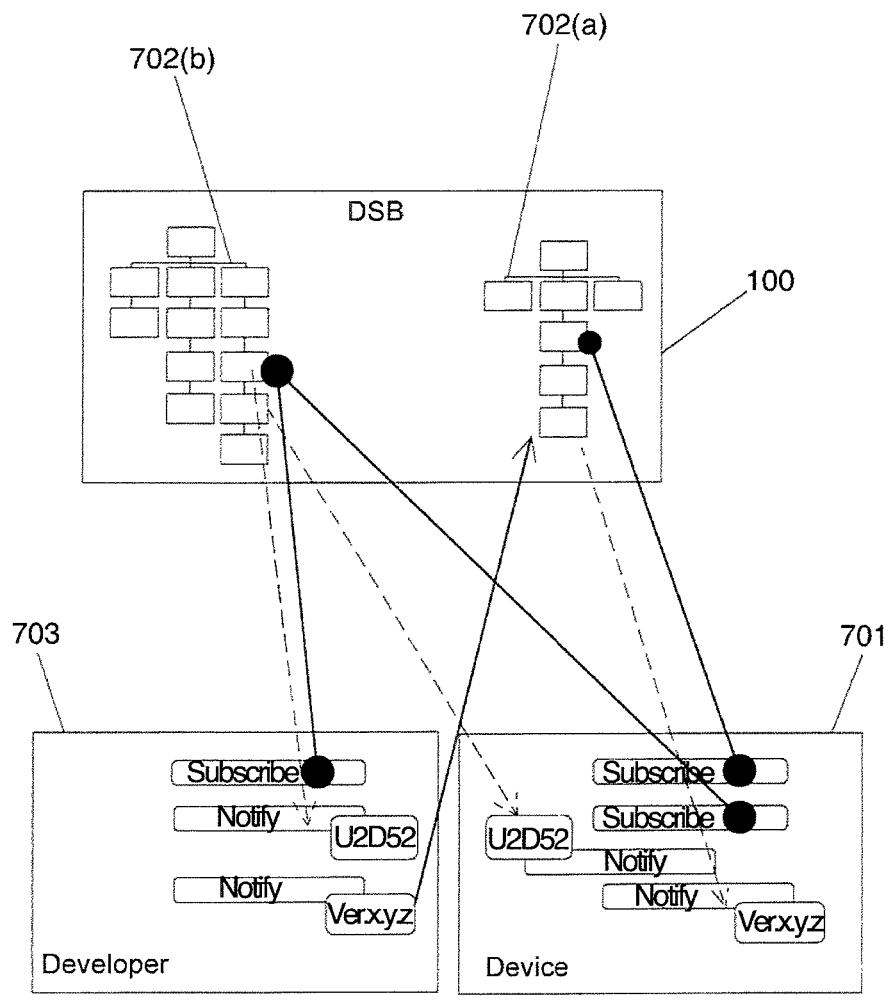
FIG. 7 illustrates a concept of automatic application upgrade operated by the DSB.

Automatic Application Upgrade:

FIG. 7 illustrates a concept of automatic application upgrade in an M2M system according to an aspect of the present invention. Automatic Application Upgrade allows an automatic management of the lifecycle of applications running on the devices interacting with a M2M Marketplace. In particular it enables the device logic to use new dataset or changes in the dataset description (ontologies) with minimal intervention from the application developer.

FIG. 7 shows a device 701 operating in the deployment environment and interacting with a M2M Marketplace, a DSB 100 which stores the ontologies 702 (*a*)-702 (*b*) of the M2M Marketplace, and a developer 703. The developer 703 is the developer of the application running on the device 701.

Referring to FIG. 7, the device 701 is subscribed to the ontology of the application versions 702 (*a*) and the ontology of the datasets 702 (*b*) used by the application itself. The developer 703 is subscribed to the ontology of the datasets 702 (*b*) used by the application running on the device 701.

When a change in the semantics of a dataset is determined by the DSB 100, the DSB 100 notifies the device 701 and the developer 703 about the change. The developer 703 evaluates the possibility to upgrade the application running on the device 701 on the basis of the change in semantics of the dataset. The device 701 receives the notification and waits for the upgraded version of the application. The developer 703 upgrades the application running on the device 701 to a new version and inserts the ontology of the new version of the application in the ontology of the application versions 702 (*a*). The DSB 100 notifies the device 701 about the availability of a new version of the application running on the device 701. The device 701 downloads the new version of the application and upgrades itself. The Application Lifecycle Manager 112, facilitates all the interaction between the developer 703 and the DSB 100, providing a user interface that abstracts the SOP protocol details. The user interface can be for example a web interface.

Figure 8:
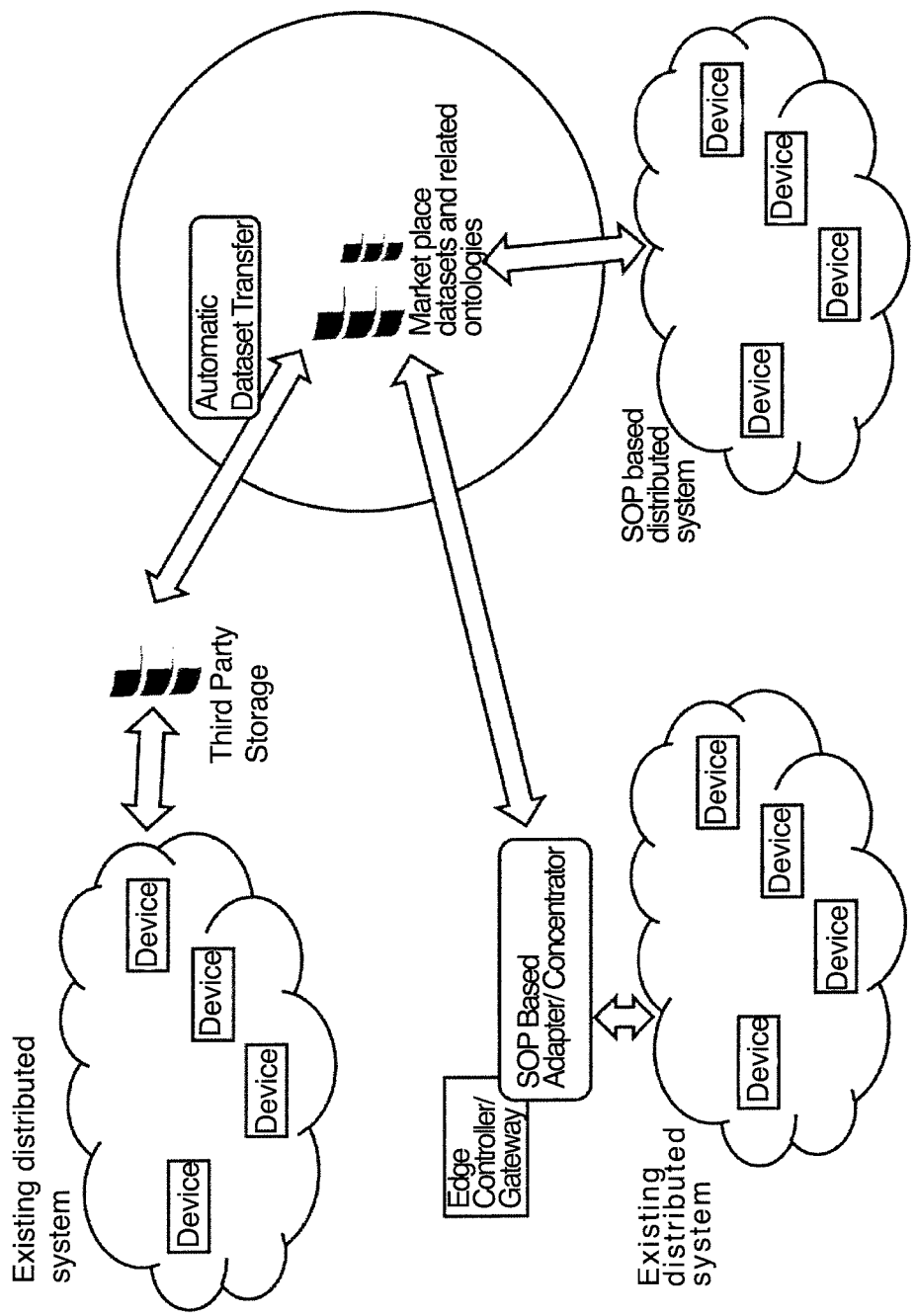
FIG. 8 illustrates a concept of automatic data collection and usage according to the present invention.

Automatic Data Collection and Usage:

FIG. 8 illustrates a concept of an automatic data collection and usage according to the present invention. This concept provides a possibility for the devices to autonomously link, produce and consume data to/from datasets. As shown in FIG. 8, three solutions are available to work with datasets:
1. SOP native solution, the distributed system is natively based on SOP and the M2M distributed system interacts directly to the M2M Marketplace.
2. Hybrid solution, where data flow from an existing distributed system to and from an edge controller on which runs an adapter/concentrator application, based on SOP, and from there as solution 1;
3. Dataset to and from a fully proprietary distributed system are synchronized by the M2M Marketplace to the DSB internal storage of dataset and corresponding ontologies.

From the foregoing detailed description of certain embodiments, it will be apparent that modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention.

The invention claimed is:

1. A method for data management in the interaction between machines in a deployed system in which a plurality of devices are connected to a Dataset Semantic Broker (DSB) platform that stores ontologies, wherein the ontologies comprise semantic representation and semantic description of concepts of datasets, wherein the semantic description comprises an association to a specific database in which raw data are stored, the raw data not being contained in the DSB but being located in a non-relational database not being a part of the DSB, wherein the association refers to a physical reference to the dataset, selected between an IP address to the database server, a database name and a specific table, the method providing automatic associations between devices and datasets, wherein the association between the devices and datasets is represented by the relation between the device ontologies and dataset ontologies stored in the DSB;

wherein the method comprises the following steps:
   i) initiating, by at least one device of the plurality of devices, a request for the dataset, wherein the request is made to the DSB platform and said request comprises the ontology of the requested dataset;
   ii) redirecting, by the DSB platform, the request to a Dataset Link Manager (DLM);
   iii) identifying, by the DLM, a matching dataset;
   iv) notifying, by the DSB platform, the at least one device with the ontology of the matching dataset, wherein said ontology allows the device to access the matching dataset related data;
   v) allowing the at least one device to perform an operation by producing or consuming data to or from the ontology of the matching dataset or the matching dataset related data.

2. The method of claim 1, wherein the communication between the at least one device and the DSB platform is provided by a communication manager, wherein the communication manager implements one or more of a plurality of protocols to communicate with the at least one device operating in the deployment environment and wherein the communication manager utilizes either a Service Oriented Protocol (SOP) or an Application Programming Interface (API) to communicate with DSB.

3. The method of claim 1, wherein ontologies are datasets ontologies and user ontologies, and wherein user ontologies comprise system ontologies, device ontologies and dataset ontologies related to the user application: system ontologies describe a system deployment specific to the user while the device ontologies describe different devices being part of the deployed system.

4. The method of claim 3 wherein the requesting step comprises:
   subscribing, by the at least one device, to user ontologies stored in the DSB;
   inserting, by the at least one device, the ontology of a requested dataset into the dataset requests ontology, stored on the DSB platform.

5. The method of claim 1, wherein the redirecting step comprises notifying the DLM, by the DSB platform, about the requested dataset by the at least one device.

6. The method of claim 1, wherein the identifying step comprises:
   querying, by the DLM, the dataset ontologies stored on a relational database DBMS and identify the matching dataset ontology to the requested dataset;
   inserting, by the DLM, said ontology of the matching dataset ontology into user ontology.

7. The method of claim 1, wherein said ontology of the matching dataset comprises an association to the database containing the raw data.

8. The method of claim 1, further comprising an automatically upgrading step comprising:
   determining, by the Dataset Semantic Broker (DSB) platform, at least one change in a semantic representation of a dataset to which the at least one device is associated;
   notifying, by the DSB platform, the at least one device and a developer of the application program software running on the at least one device about said change in a semantic representation of a dataset;
   waiting, by the at least one device, for a new application program software version;
   updating, by the developer, the application program software to a new version;
   inserting, by the developer, a dataset ontology of the new version of the application program software, into the DSB platform;
   notifying, by the DSB platform, the at least one device about availability of the new version of the application program software;
   downloading, by the at least one device, the new version of the application program software.

9. The method of claim 1 further comprising a dataset virtualization step comprising:
   initiating, by at least one device of a plurality of operating devices, a request for a dataset, wherein the request is made to the Dataset Semantic Broker (DSB) platform, and the DSB platform facilitating association of datasets with the devices even if a dataset corresponding to the request is not available in the DSB platform;
   analyzing, by a Dataset Virtualizer, existing dataset ontologies, wherein the existing dataset ontologies are stored on the DSB platform;
   creating, by the Dataset Virtualizer, a virtual dataset by using at least subsets of the existing dataset ontologies, wherein the virtual dataset is obtainable by direct mapping on subsets of existing datasets or inferred with reasoning algorithms from subsets of existing datasets,
   providing, by the DSB platform, the ontology of the virtual dataset to the at least one device.

10. The method of claim 9, wherein the Dataset Virtualizer uses the semantics representation of the existing dataset ontologies to determine the possibility to create a virtual dataset.

\* \* \* \* \*